Figure 1:
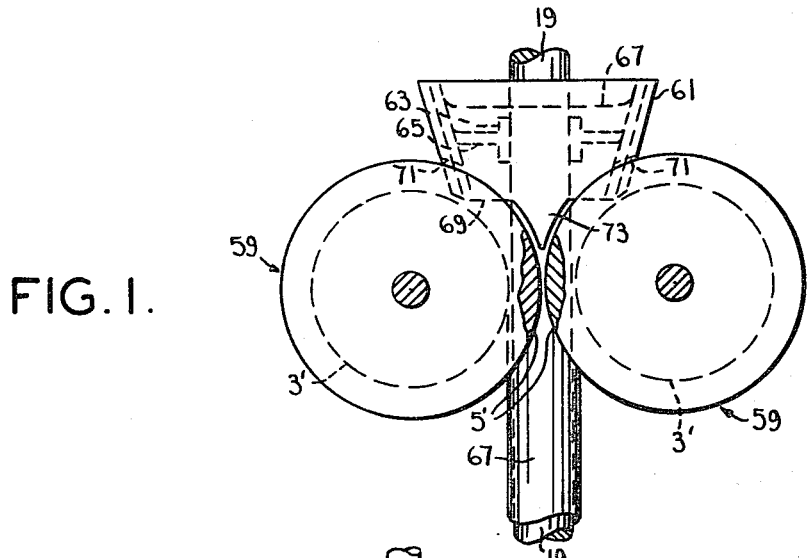

June 25, 1968    K. B. CLARK    3,389,455

METHOD OF MAKING CLAD RODS AND TUBING

Filed Sept. 20, 1965

Kenneth B. Clark,
Inventor.

Koenig, Senniger,
Powers and Leavitt
Attorneys

United States Patent Office 3,389,455
Patented June 25, 1968

3,389,455
METHOD OF MAKING CLAD RODS AND TUBING
Kenneth B. Clark, Spragueville, R.I., assignor to Texas Instruments Incorporated, Dallas, Tex., a corporation of Delaware
Continuation-in-part of applications Ser. No. 63,678, Oct. 19, 1960, and Ser. No. 93,513, Mar. 6, 1961. This application Sept. 20, 1965, Ser. No. 488,332
10 Claims. (Cl. 29—420)

This application is a continuation-in-part of my copending United States patent application Ser. No. 63,678, filed Oct. 19, 1960, for Forming and Solid-Phase Bonding which resulted in Patent No. 3,220,106, and a continuation-in-part of Ser. No. 93,513, filed Mar. 6, 1961, for Manufacture of Clad Rods, Tubing and Clad Tubing which resulted in Patent No. 3,220,107.

This invention relates to clad rods and tubing, and with regard to certain more specific features, to cladding of such rods and tubing by application thereto of powders.

All information set forth in my abovementioned patent applications which is pertinent to the powder-cladding subject matter of the present invention is incorporated herein by reference. There are several advantages of cladding with powders. Many powders are cheaper than the same material in strip form in the size needed to produce the same cladding thickness. Wires with the cladding material which is harder than the core can often be more easily made with powders than the strip cladding material. There is less cladding scrap with powder than with strip used for cladding. There is no fin to be removed with powders. Usually smaller reductions are required to bond powders to solid wrought metals than to bond solid wrought metals to solid wrought metals.

Among the several objects of the invention may be noted the provision of a process of manufacturing products of the class above described by means of a simple, economical and high-speed rollforming and bonding operation, said products in a wide variety of shapes, sizes and lengths having superior accuracy, finishes and bond strengths; the provision of rod and tubing products on which the cladding is improvedly solid-phase bonded; the provision of a process of the class described which by employing a heating step for solid-phase bonding permits of the use of smaller reductions under pressure for bonding and cylinder formation while at the same time producing a superior product; the provision of a process of the class described in which said heating step is of the differential temperature type permitting improved bonding and cladding of materials having different working properties as, for example, comparatively hard and soft properties or comparatively brittle and ductile properties, examples of brittle materials being graphite and molybdenum; and the provision of a cladding process for rods and tubing in which powdered cladding material and core material of different work properties may be differently treated for improved solid-phase bonding. Other objects and features will be in part apparent and in part pointed out hereinafter.

The invention accordingly comprises the elements and combinations of elements, steps and sequence of steps, features of construction and manipulation, and arrangements of parts which will be exemplified in the structures and methods hereinafter described, and the scope of which will be indicated in the following claims.

Figure 2:
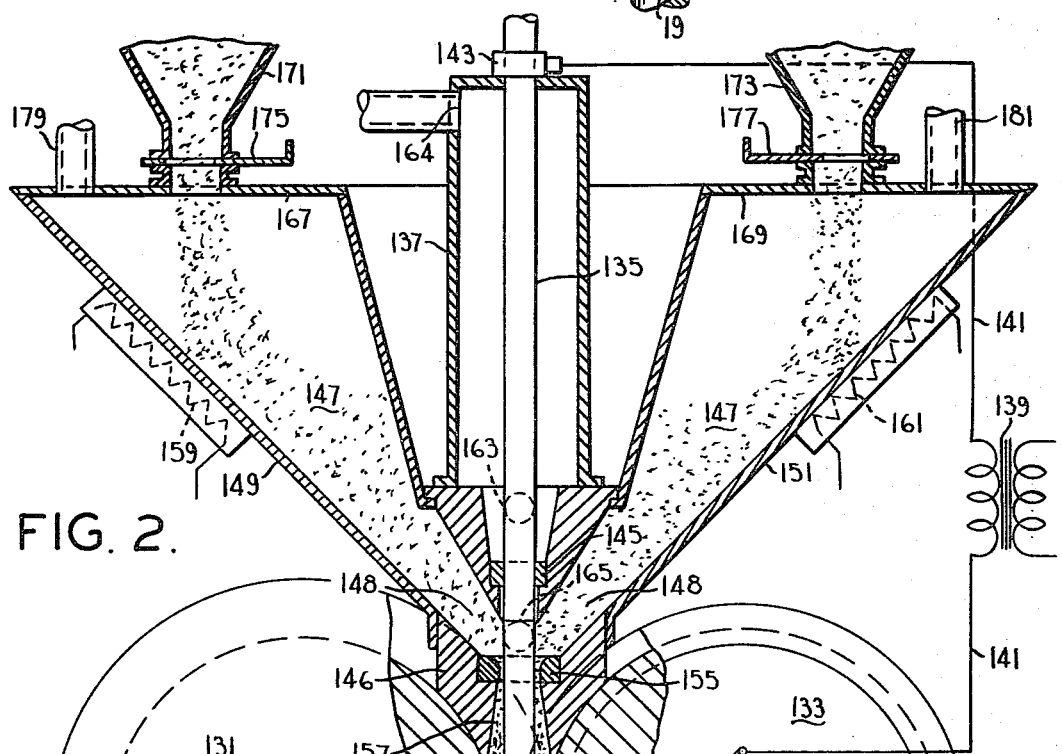

In the accompanying drawings, in which several of various possible embodiments of the invention are illustrated, FIG. 1 is a diagrammatic side elevation, partly in section, illustrating one form of the invention as applied to the manufacture of clad wire; and FIG. 2 is a view similar to FIG. 1 illustrating another form of the invention.

Corresponding reference characters indicate corresponding parts throughout the several views of the drawings.

The term metal as used herein means any malleable or deformable metal, including alloys. The term solid-phase bonding as used herein means bonding under conditions of cleanliness, pressure and deformation without the production of liquid-phase material or brittle intermetallic compounds in any appreciable amount, as set forth, for example, in U.S. Patent 2,691,815. The term cladding material comprehends metal and glass, ceramics, carbon, cermets and the like. Thus cladding may be effected by electrically conductive or insulating materials. The term material comprehends metals and nonmetals such as above-mentioned and dielectrics such as nylon, polyethylene, tetrafluoroethylene polymer or the like. The term reduction means a reduction in cross section brought about by squeezing pressure. The terms wire, rod and core are to be taken as synonymous and may have any appropriate cross section, such as circular, elliptical, et cetera.

Referring now more particularly to FIG. 1, numerals 59 show compression rolls arranged with their axes side-by-side and in a common horizontal plane. They have lands 5' in close tangential juxtaposition. Between these lands 5' are semicircular grooves 3'. These are large enough in diameter to receive core material 19 with, if desired and as shown, surrounding spacing from the grooves. However, the core diameter may also be equal to or larger than the groove diameter and still achieve cladding and bonding as will be described. Adjacent the rolls, as shown, is a hopper 61, supporting a central guide 63 on spokes 65. The lower margins of the hopper are notched as shown at 71, to interdigitate with the axial contours of the rolls and form dams. At its ends the hopper has appropriately shaped tongues 73 forming endwise dams.

The hopper contains a clean powder cladding material 67 which gravitates through the open lower ends 69 of the hopper 61. In doing so, it passes through the openings between the spokes 65. After leaving the hopper, it enters between the cores (one of which is shown at 19) and the grooves 3'. Here it is compressed around the core 19 and squeezed between the lands 5'. Thus the powder contained by the hopper surrounds the cores, being squeezed and compacted into cladding compressed about the cores. This is true whether or not clearance is provided between the grooves and the core.

Upon the clad cores leaving the rolls, the comminuted powder particles are not least partially bonded to each other and to the core 19. Thereafter a sintering step is employed. This sintering step increases the bond strength between the compressed powder particles and between the compacted powder cladding and the surface of the cores 19 (presumed to have been cleaned). The resulting clad wire is then ready for further processing, as for example, drawing or the like. The material constituting the power 67, may for example, be any metals or alloys thereof, or nonmetals such as ceramics, cermets, carbon, glass, powders of which are susceptible to coherence upon squeezing the bonding upon sintering. The product is constituted by compressed and sintered powder forming a practically solid mass adhering strongly to the cores 19.

Referring now more particularly to FIG. 2, squeezing rolls are shown at numerals 131 and 133. Core material is shown at 135, which may be of rod or tube form. The core 135 passes through a retort 137 carrying an inert or reducing atmosphere in a manner to be described. The core wire 135 is resistance-heated by passing electric current therethrough from a transformer 139 over a circuit 141 and through commutating means 143 to the core 135. The circuit is otherwise closed through roll 133, as will appear. The core 135 is guided between rolls 131 and 133 by a guide ring 145 in a guide block 146. Finely divided material such as powder 147 from hoppers 149 and 151 is fed through openings 148 in block 146 into an orifice piece 155 which spacedly surrounds the core. Thus the powder surrounds the core wires at openings 148 as the core emerges from the guide 145. The powder 147 is propelled partly by gravity and partly by the moving core 135 to flow downward along with the core through the orifice piece 155 and a flaring nozzle portion 157 of the block 146. Thus metering of the powder 147 is effected by the orifice piece 155 and the flare 157 assures a homogeneous distribution of the powder around the core. Various interchangeable orifice pieces may be supplied for changing the metering rate.

From the nozzle 157 the powder which surrounds the downwardly moving core 135 proceeds therewith to the pinch point 153 between the rolls 131 and 133. This pinch point is closely adjacent to the outlet of the flare 157. Cladding thickness can be varied by changing the proportions of the cross section of the orifice, the core cross section and the roll opening area. Powder size, shape and density will also affect the cladding thickness, as well as roll diameter, roll surface finish, roll speed and material temperatures. The temperature of the core 135 is controlled from the circuit 141. The temperature of the powder 147 can be controlled by means of heaters 159, 161, which are in heat-exchange relation with the hoppers 149 and 151.

A reducing or inert atmosphere is introduced into the retort 137 through an opening 163, escaping at port 164. A reducing or inert atmosphere is also introduced into the powder hoppers 149 and 151 through an opening 165 communicating with openings 148. The hoppers 149 and 151 are enclosed by covers 167 and 169, respectively, and are filled with powder through control gates 175 and 177 of the filling hoppers 171 and 173, respectively. Powder in the hoppers serves as a trap to prevent the escape or contamination of the atmosphere in the hoppers. The reducing atmosphere introduced into the hoppers 149, 151 escapes outward through pipes 179 and 181. The atmosphere used to flush the core 135 and powder 147, as described, whether inert or reducing, may as is usual be referred to as a protective atmosphere.

The powder is caused to trickle from the hoppers 171 and 173 at a fast enough rate to replenish the supply. Much of the entrapped air contained by the loose powder will mix with the inert or reducing atmosphere in the hoppers and flow out of the hoppers through the exit tubes 179, 181. Thus the powder settles down into the hoppers and most of the gases that were entrapped therewith upon entry become replaced by the inert or reduced atmosphere. Heating of the powder by means of the heaters 159, 161 serves to aid removal of air from the entering powder and also any water vapor contained therein. The water vapor, along with the air thus removed, will flow out of the pipes 179, 181. The use of resistance heating in core 135 and powder heating by the heaters 159 and 161 provides for controlled differential heating.

The powder may be composed, for example, of copper, nickel, tungsten, etc., or a nonmetal such as carbon, glass, silicon carbide, et cetera. It will be noted that in such event the heating circuit 141 for core 135 is completed through the members 146 and 145, both of which are current-conductive. The core may be a solid or hollow cylinder of copper, nickel, tungsten, etc., or a nonmetal such as carbon, glass, silicon carbide, et cetera. When a nonconductor such as glass, for example, is used for the core material, direct resistance heating such as illustrated in FIG. 19 cannot be used. In such event, heating will be carried out by means other than resistance heating, as by external heating, for example.

The rolls 131 and 133 compact the powder around the core 135 and at the same time bond the powder cladding to the core material. The cladding material is heated to a temperature at which sintering between its particles and pressure bonding therebetween and to the core 135 will occur under squeezing action of the rolls 131, 133. The core reduction effected by the roll pressures as the powdered material is squeezed into place may be as low as 1% to 10% on the core diameter.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. The method of producing clad products comprising heating a metal core, feeding said metal core into inwardly spaced relation with tangently related grooves of tangently rotating rolls having tangent lands adjacent their grooves, feeding powdered metal cladding material into the space between said core and said grooves, and adjusting the spacing between the rolls to squeeze the powdered cladding material against the core with a force sufficient to produce a solid-phase bond between powder particles and between some of them and said core and sintering the core with the partially bonded powder thereon to increase the bonds between the powder particles and between them and the surface of the core.

2. The method of producing clad products comprising heating a metal core, feeding said metal core into inwardly spaced relation with tangently related grooves of tangently rotating rolls having tangent lands adjacent their grooves, feeding nonmetal powder cladding material into the space between said core and said grooves, and adjusting the spacing between the rolls to squeeze the powdered cladding material against the core with a force sufficient to produce a solid-phase bond between powder particles and between some of them and said core and performing any necessary sintering operations thereon to increase the bonds between the powder particles and between them and the surface of the core.

3. The method according to claim 2, including the step of heating the cladding material.

4. The method of producing clad cylindrical products, comprising heating a core, feeding said core between tangently related grooves of tangently rotating rolls, feeding material in powder form between the core and said grooves for squeezing thereof against the core by the rolls to compact the powder and effect a partial bond between the powder particles and between some of them and said core, and thereafter sintering the core with the partially bonded powder thereon to increase the bonds between the powder particles and between them and the surface of the core.

5. The method according to claim 4, including the step of heating the powder.

6. The method according to claim 5, including the step of flushing the core with a protective atmosphere as it approaches the grooves.

7. The method according to claim 5, including the step of flushing the powder with a protective atmosphere as it approaches the grooves.

8. The method according to claim 5 including the step of flushing the core and the powder with a protective atmosphere as they approach the grooves.

9. The method of producing clad cylindrical products, comprising heating a metal core, feeding said metal core between tangently related grooves of tangently rotating rolls, feeding metal cladding material in powdered form into the space between the core and said grooves for squeezing thereof against the core by the rolls to compact the powder and effect a partial bond between the powder particles and between some of them and said core, and thereafter sintering the core with the partially bonded powder thereon to increase the bonds between the powder particles and between them and the surface of the core.

10. The method according to claim 9, including the step of independently heating the powder and the core.

References Cited

UNITED STATES PATENTS

| | | | |
|---|---|---|---|
| 1,944,073 | 1/1934 | Fogg | 29—477.7 |
| 2,735,170 | 2/1956 | Moffatt | 29—488 |
| 2,746,141 | 5/1956 | Hobrock | 29—498 X |
| 2,815,567 | 12/1957 | Gould | 29—420 |
| 2,975,087 | 3/1961 | Donald | 29—477.7 |
| 3,046,649 | 7/1962 | Brennan | 29—474.3 |
| 3,083,407 | 4/1963 | Leib | 29—420 X |
| 3,095,500 | 6/1963 | Jost | 29—497.5 X |
| 3,104,135 | 9/1963 | Morrison. | |
| 3,152,892 | 10/1964 | Clark. | |

FOREIGN PATENTS

| | | |
|---|---|---|
| 122,897 | 5/1931 | Austria. |
| 825,953 | 12/1959 | Great Britain. |

CHARLIE T. MOON, *Primary Examiner.*

R. F. DROPKIN, *Assistant Examiner.*